(No Model.)

G. W. FORD.
TIRE UPSETTER.

No. 325,793. Patented Sept. 8, 1885.

Witnesses.
Jennie H. Caldwell
Luke Frieher

Inventor.
George W. Ford
By James Sangster
Atty.

UNITED STATES PATENT OFFICE.

GEORGE W. FORD, OF ELBA, NEW YORK.

TIRE-UPSETTER.

SPECIFICATION forming part of Letters Patent No. 325,793, dated September 8, 1885.

Application filed July 22, 1885. (No model.)

*To all whom it may concern:*

Be it known that I, GEORGE W. FORD, a citizen of the United States, residing in Elba, in the county of Genesee and State of New York, have invented certain new and useful Improvements in Tire-Upsetters, of which the following is a specification.

The object of my invention is to provide a light, portable, and cheap device adapted to be used in any blacksmith's vise for upsetting tires, and will be fully and clearly hereinafter shown, described, and claimed by reference to the accompanying drawings, in which—

Figure 1:
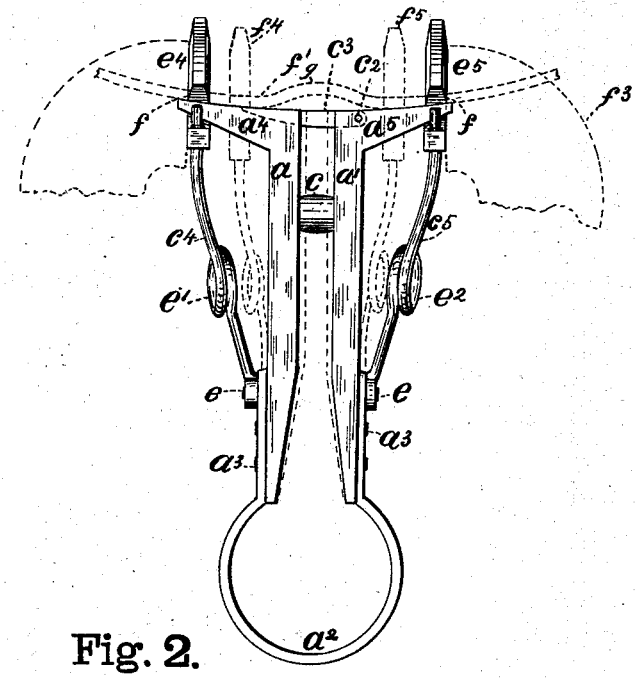
Figure 2:
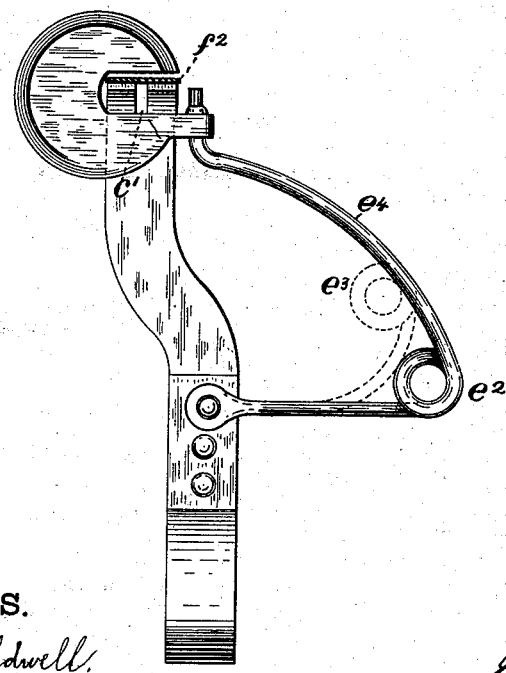

Figure 1 is a front elevation; and Fig. 2 represents a side elevation, showing also a portion of a tire in position to be operated on.

In said drawings, $a\ a'$ represent two arms riveted to a spring, $a^2$, by rivets $a^3$, or rigidly secured to it in any other well-known way. The upper parts of these arms are made in the form of wedges $a^4\ a^5$, and between them is a rubber or other suitable spring, $c$.

In the top of each of the wedge shaped portions $a^4\ a^5$ is a slot or groove, $c'$, into which is secured, by a pin, $c^2$, in the portion $a^5$, a small piece of metal, $c^3$, adapted to lie in the position in said slot as shown in Fig. 1; but the opposite end being free and fitted loosely in the slot allows the arms to be easily moved to or from each other. Its object is to close the opening between the wedge-shaped portions, so as to prevent the tire while being upset from bending down between the jaws; but in some cases it may be dispensed with.

The side springs, $c^4\ c^5$, are secured by bolts or rivets $e$ to the lower portions of $a\ a'$. These springs are preferably made with a spiral bend, $e'\ e^2$, at some convenient point, either, as shown in Fig. 1, at $e'$, or at or about the position $e^2$ shown in Fig. 2, or by the dotted lines $e^3$. These spiral bends allow the springs to act better and with more elasticity. The upper ends of the springs $c^4\ c^5$ are provided with side pieces, $e^4\ e^5$, rigidly secured thereto, and each having an opening, $f$, into which the wedge-shaped portions $a^4\ a^5$ pass, the tendency of the springs being to keep them away from each other or outward near the smaller ends of the wedges. (See Fig. 1.)

In operating with my invention a tire to be upset is placed in the position shown by the dotted lines $f'$ in Fig. 1 and by the sectional piece $f^2$ in Fig. 2. The device is then put into a vise, (of any kind,) as shown by the dotted lines $f^3$ in Fig. 1, which represent a portion of the jaws of an ordinary blacksmith's vise. They are then screwed up so as to bring the parts into the position shown by the dotted lines $f^4\ f^5$, thereby upsetting the tire or producing an upward bend, $g$, which, as the iron is hot, can be easily brought down to the parts $a^4\ a^5\ c^3$, thereby upsetting the tire, which operation may be continued until the tire has been reduced sufficiently in size.

I claim as my invention—

A tire-upsetter consisting of the portions $a\ a'$, secured to a spring at the bottom and provided with wedge-shaped portions at the top, in combination with the side springs, $c^4\ c^5$, provided with jaws $e^4\ e^5$, for the purposes described.

GEORGE. W. FORD.

Witnesses:
A. M. WILLIS,
A. L. TURNER.